United States Patent
Mitov

(10) Patent No.: US 8,224,627 B2
(45) Date of Patent: Jul. 17, 2012

(54) TECHNIQUE FOR DETERMINATION OF THE SIGNAL SUBSPACE DIMENSION

(76) Inventor: Iliya P. Mitov, Vidin (BG)

( * ) Notice: Subject to any disclaimer, the term of this patent is extended or adjusted under 35 U.S.C. 154(b) by 274 days.

(21) Appl. No.: 12/768,795

(22) Filed: Apr. 28, 2010

(65) Prior Publication Data

US 2011/0267233 A1    Nov. 3, 2011

(51) Int. Cl.
*G06F 15/00*    (2006.01)
(52) U.S. Cl. ...................................................... 702/196
(58) Field of Classification Search .......... 702/190–197, 702/FOR. 164; 342/417
See application file for complete search history.

(56) References Cited

U.S. PATENT DOCUMENTS

| | | | |
|---|---|---|---|
| H00037 H | 11/1987 | Abo-Zena et al. | |
| 4,750,147 A | 6/1988 | Roy et al. | |
| 4,965,732 A | 10/1990 | Roy et al. | |
| 5,262,789 A | 11/1993 | Silverstein | |
| 5,359,333 A | 10/1994 | Withers | |
| 5,748,507 A * | 5/1998 | Abatzoglou et al. | 702/190 |
| 7,372,404 B2 | 5/2008 | Shirai et al. | |
| H2222 H * | 8/2008 | Rangaswamy et al. | 342/159 |

OTHER PUBLICATIONS

M. Wax et al., Detection of Signals by Information Theoretic Criteria, IEEE Transactions on Acoustics, Speech and Signal Processing, vol. 33(2), p. 387-392, Apr. 1985.*
A. J. Van Der Veen et al., "Subspace Based Signal Analysis using Singular Value Decomposition", Sep. 1993, Proc. IEEE, vol. 81, pp. 1277-1308. USA.
R. Badeau et al., "A new perturbation analysis for signal enumeration in rotational invariance techniques", Feb. 2006, IEEE Trans. SP, vol. 54, pp. 450-458. USA.
J. M. Papy et al., "A Shift Invariance-Based Order-Selection Technique for Exponential Data Modeling", Jul. 2007, IEEE Signal Processing Letters, vol. 14, pp. 473-476. USA.

* cited by examiner

*Primary Examiner* — Jack W Keith
*Assistant Examiner* — Fred H Mull
(74) *Attorney, Agent, or Firm* — Michael Coblenz

(57) ABSTRACT

A technique for determination of the signal subspace dimension K in direction of arrival estimation and in exponentially damped sinusoids modeling (where K represents respectively the number of detected objects and the model order) by using the ratios between the squared singular values of the processed data matrix and of its sum with an auxiliary matrix composed of random entries from a normal distribution. The disclosed noise addition technique (NAT) is computationally effective and thoroughly tuned for use in each one of the designated tasks, causes very few false alarms, operates accurately within or below the SNR limits attained by others techniques and downwards determines a steadily decreasing to zero dimension K of the signal subspace.

6 Claims, 3 Drawing Sheets

TECHNIQUE FOR DETERMINATION OF THE SIGNAL SUBSPACE DIMENSION

CROSS REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The present invention relates to and provides with a concrete basis the subspace methods for signal analysis used in direction of arrival (DOA) estimation and in exponentially damped sinusoids (EDS) modeling. The DOA estimation is essential task of radar, sonar and other similar systems, where an array of sensors is used to detect and locate some wave-reflecting or emitting objects, and the EDS modeling has practical application in various areas including the digital audio. In the invention field the samples obtained by analog-to-digital conversion (ADC) of the respective sensors signals are put into a data matrix that is numerically processed through a computer needed to achieve the desired results of the DOA estimation or the EDS modeling in real-time.

2. Description of the Related Art

The popularity of the subspace methods (see A. J. van der Veen et al., "Subspace Based Signal Analysis using Singular Value Decomposition", September 1993, *Proc. IEEE*, vol. 81, pp. 1277-1308) is owing to their superior spatial or frequency resolution at feasible signal-to-noise ratios (SNR). These methods consider the space spanned by the eigenvectors of the product XX' of the processed L×M data matrix X and its complex conjugate transpose X'.

In the DOA estimation the M columns of X are complex-valued 'snapshots' across an array of $L \geq 2$ sensors, which signals are put in the rows of X, and as a rule $M \geq 100$, $M \gg L$.

In the EDS modeling the observed series $x=[x_0, x_1, \ldots, x_{n-1}]$ of $n \geq 100$ real or complex-valued signal samples is set into a structured (Hankel) L×M matrix X with L=M−1 or L=M and L+M−1=n. The EDS model of x is $$x_i = \sum_{k=1}^{K} c_k z_k^i + w_i \quad (1)$$

$$i = 0, 1, \ldots, n-1$$

where K is the model order, $c_k$ are the amplitudes of the components, $z_k = \exp[(-\alpha_k + j2\pi f_k)\Delta t]$ are the signal poles with damping factors $\alpha_k$ and frequencies $f_k$, j is the imaginary unit, $\Delta t$ is the sampling interval of x and $w_i$ is the random noise in $x_i$. Owing to its generality the EDS model is used in various areas including the digital audio, where an adequate application of this model can originate improved coding schemes.

In the DOA estimation the eigenvectors are obtained mainly by direct computation and eigenvalue decomposition (EVD) of the product XX', while the subspace methods in the EDS modeling use singular value decomposition (SVD) of the processed data matrix X:

$$X = U\Sigma V' \quad (2)$$

where U and V are L×L and M×M unitary matrices and Σ is L×M diagonal matrix containing the singular values $\sigma_{X,1} \geq \sigma_{X,2} \geq \ldots \geq \sigma_{X,L} \geq 0$ of X. From (2) and the EVD definition it follows that the squared singular values of X and the columns of its left singular matrix U represent the eigenvalues and the eigenvectors of the product XX'.

All subspace methods are based on the partition of the space span {U} into a dominant part (referred to as signal subspace) spanned by the first K columns of U and a secondary part (referred to as noise subspace) spanned by the last $L-K \geq 1$ columns of U. For data matrices X with finite sizes this partition is plain only in the case of noiseless X henceforth denoted as S, when the singular values are $\sigma_{S,1} \geq \ldots \geq \sigma_{S,K} > \sigma_{S,K+1} = \ldots = \sigma_{S,L} = 0$ and the subspace methods are exact. Provided that the signal subspace dimension K (that in the DOA estimation represents the number of detected objects and in the EDS modeling represents the model order) is known, most methods perform satisfactorily also in the presence of some additive noise, but the determination of K for noisy data matrices is an open problem.

Usually in the DOA estimation the signal and noise subspaces are partitioned by the information theoretic criteria (ITC), that are based on the properties of the sample covariance matrix XX'/M with $M \to \infty$. When the rows of X contain uncorrelated zero mean white noise W of variance $\sigma_W^2$, for very large M the squared singular values $\sigma_{X,k}^2$ of X=S+W approach $\sigma_{S,k}^2 + M\sigma_W^2$, where $\sigma_{S,k}$ are the above-cited singular values of the noiseless S and hence the last L-K eigenvalues of XX' are asymptotically equal to $M\sigma_W^2$. Since all ITC presume similar uniformity, they are appropriate only in the cases of high SNR, otherwise tend to overvalue the signal subspace dimension K and cause false alarms in the systems for DOA estimation. Therefore some more elaborated methods for determination of the signal subspace dimension K by using the eigenvalues of the product XX' are proposed, however generally they are very difficult to tune and automate.

The eigenvalue-based techniques for the subspaces partition perform worse in the EDS modeling, where the signal components are non-stationary and have highly varied amplitudes. Besides the assumption for uncorrelated noise is inconsistent with the Hankel structure of the data matrices X, that in the cases of real-valued signals with pairs of complex conjugate terms in the model (1) contain only L+M−1 instead of 2LM independent measurements used in the DOA estimation. These difficulties are surmounted to some extent by the recent eigenvector-based techniques for EDS model order selection (see R. Badeau et al., "A new perturbation analysis for signal enumeration in rotational invariance techniques", February 2006, *IEEE Trans. SP*, vol. 54, pp. 450-458 and J. M. Papy et al., "A Shift Invariance-Based Order-Selection Technique for Exponential Data Modeling", July 2007, *IEEE Signal Processing Letters*, vol. 14, pp. 473-476). Negative traits of such techniques are burdensome computations, omission of some weak components if there are much stronger ones, unsteady results at low SNR and impossibility to cover the case of signal subspace dimension K equal to zero, that arises when the processed data matrix X contains only (or highly predominating) noise W.

What the subspace methods used in DOA estimation and in EDS modeling need is a technique for determination of the signal subspace dimension K that is computationally effective and easily tunable, causes very few false alarms, operates accurately within or below the SNR limits attained by others techniques and downwards determines a steadily decreasing to zero dimension K of the signal subspace.

BRIEF SUMMARY OF THE INVENTION

According to the present invention, the signal subspace dimension K is determined by using the ratios $r_k = \sigma_{X,k}^2 / \sigma_{Y,k}^2$ with k=1, . . . , L between the squared singular values of the processed L×M data matrix X and of Y=X+N, where N is an auxiliary matrix that fits X in sizes, structure and kind (complex-valued or real) and is composed of random entries from a real or complex normal distribution with zero mean and standard deviation $\sigma_N$.

The disclosed noise addition technique (NAT) uses as trustworthy representatives of the noise subspace $\sigma_{X,k}$ and $r_k$ with k=$K_m$+1, . . . , $K_m$+D, where the parameter $K_m$ that fixes the maximum determinable signal subspace dimension K is set equal to the whole part of L/2 in both preferred embodiments. This selection of $K_m$ is customary as in the DOA estimation, where the disclosed NAT uses D=1 if the array includes only L=2 sensors, otherwise D=2, as well as in the EDS modeling, where L/2~n/4≧25 and D=5 is selected to adjust the NAT for the observed larger variations of $\sigma_{X,k}$ and $r_k$.

The standard deviation for the auxiliary L×M matrix N is defined as $\sigma_N = k_N s_W$, where $k_N$=3 in the DOA estimation, $k_N$=5 in the EDS modeling, $s_W$ is square root of $(\sigma_{X,Km+1}^2 + \ldots + \sigma_{X,Km+D}^2)/(DM)$ that roughly estimates the variance $\sigma_W^2$ of the noise W in the data matrix X, and to cover the cases of very clean or noiseless X without computing problems, a lower limit $\sigma_0 = 10^{-8}$ is set for $\sigma_N$. The relatively high values of $\sigma_N$ thus obtained are essential for the disclosed NAT, because they yield practically uniform ratios $r_k$ with k≦$K_m$+D corresponding to the noise subspace. This basic finding is used in the final two stages of the NAT to define a threshold $tr_r$ for the ratios $r_k = \sigma_{X,k}^2 / \sigma_{Y,k}^2$ with k=1, . . . , $K_m$ and to finish the determination of the signal subspace dimension K.

The threshold $tr_r$ is defined as $tr_r = dtr_r + (r_k + \ldots + r_{Km+D})/(K_m+D-k+1)$, where $dtr_r$=0.03 in the DOA estimation, $dtr_r$=0.02 in the EDS modeling and initially k=$K_m$+1, but to cope with casual trends of the ratios $r_k$ with k≦$K_m$ corresponding to the noise subspace, then in a programming loop for k=$K_m$, . . . , 1 the threshold $tr_r$ is updated every time when $r_k$<$tr_r$.

The signal subspace dimension K is determined using an introductory value K=0 and a programming loop for k=1, . . . , $K_m$, where if $r_k$<$tr_r$ is found the determination of K is ceased, otherwise if the NAT variable $v_k = r_k + k_v(r_k - r_{k+1})$ that is tuned by the coefficient $k_v$ to enhance the gap between the subspaces is above the threshold $tr_v = tr_r + dtr_v$ with a tuning offset $dtr_v$, K is set equal to the current index k. The tuning parameters for the NAT variable $v_k$ and its threshold $tr_v$ are $k_v$=0.75, $dtr_v$=0.03 in the DOA estimation and $k_v$=0.67, $dtr_v$=0.1 in the EDS modeling, where larger variations of the ratios $r_k$ are observed.

DETAILED DESCRIPTION OF THE INVENTION

Figure 1:
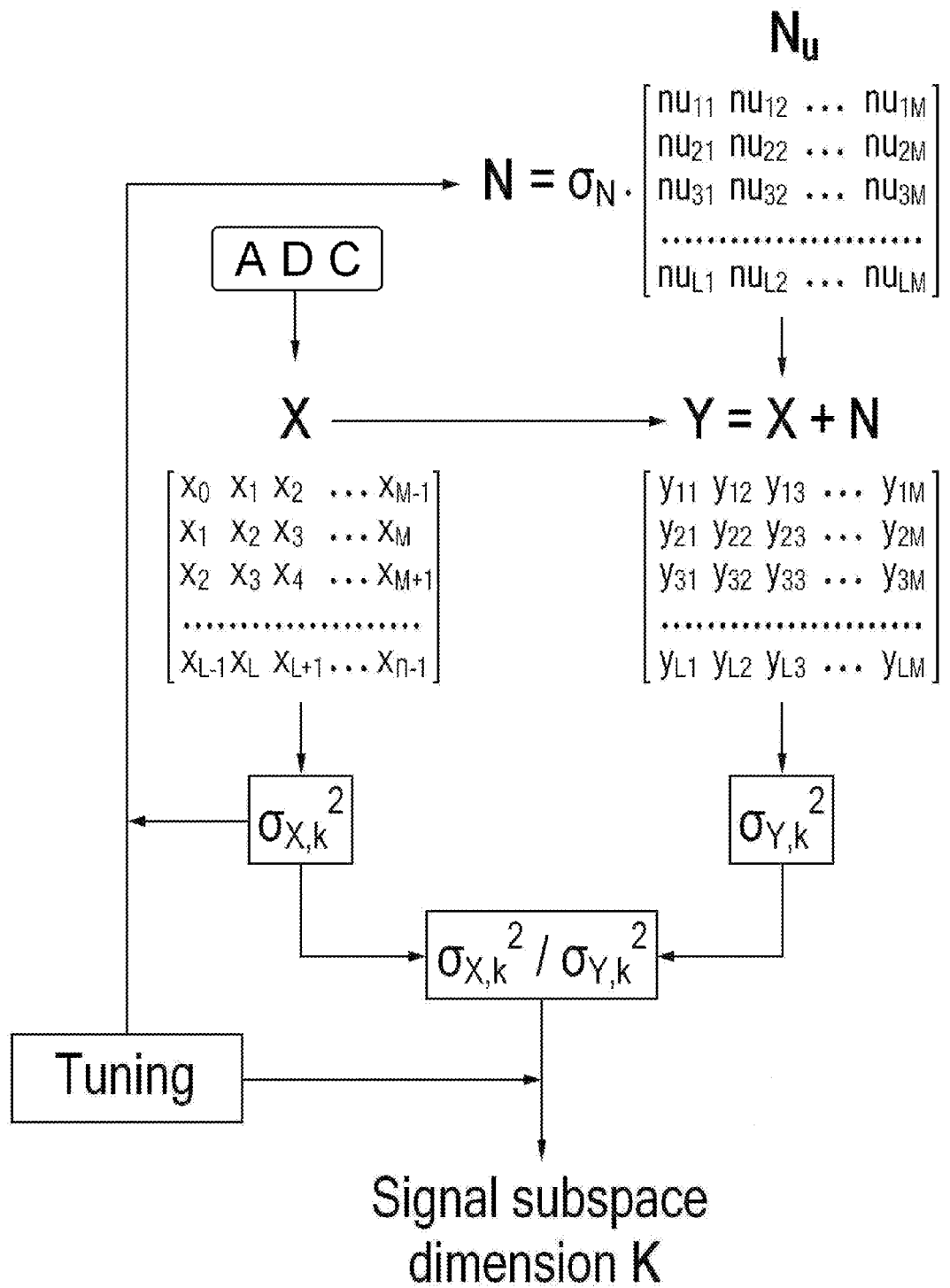
FIG. 1 represents a concise block diagram of the disclosed technique for determination of the signal subspace dimension K.

After storing the samples obtained by analog-to-digital conversion (ADC) of the respective sensors signals into a L×M data matrix X, the preferred embodiments of the disclosed technique for determination of the signal subspace dimension K include the following stages:

Preparation of a scaled to unity matrix $N_u$ that fits in sizes and kind (complex-valued or real) the data matrix X and is composed of random entries from a real or complex normal distribution with zero mean and standard deviation σ=1. Single $N_u$ is necessary when series of similar data matrices X are processed in the DOA estimation or in the EDS modeling, where the data matrices X have the Hankel structure shown in FIG. 1. A non-structured $N_u$ like that of FIG. 1 is most suitable for the DOA estimation, but in the EDS modeling the NAT performs better, if the matrix $N_u$ has Hankel structure as that of X and is formed of a scaled to unity vector nu=[$nu_0$, $nu_1$, . . . , $nu_{n-1}$] of n=L+M−1 random entries from a real or complex normal distribution with zero mean and standard deviation σ=1. Owing to the Hankel structure of $N_u$, a single vector nu is prepared at this stage in the preferred NAT embodiment for the EDS modeling;

Computation of the squared singular values $\sigma_{X,k}^2$ with k=1, . . . , L of the data matrix X after its SVD or by EVD of the product XX', where X' is the complex conjugate transpose of X. This stage is opportune to compute also the singular or eigenvectors that are requisite in all subspace methods;

Determination of the standard deviation $\sigma_N = k_N s_W$ for the auxiliary L×M matrix N=$\sigma_N N_u$, where $k_N$=3 in the DOA estimation, $k_N$=5 in the EDS modeling, $s_W$ is square root of $(\sigma_{X,Km+1}^2 + \ldots + \sigma_{X,Km+D}^2)/(DM)$ that roughly estimates the variance $\sigma_W^2$ of the noise W in the data matrix X, $K_m$ is equal to the whole part of L/2, D=5 in the EDS modeling, and in the DOA estimation D=1 if the array has L=2 sensors, otherwise D=2. To cover the cases of very clean or noiseless X without computing problems, a lower limit $\sigma_0 = 10^{-8}$ is set for $\sigma_N$;

Computation of the squared singular values $\sigma_{Y,k}^2$ with k=1, . . . , L of Y=X+N (in the NAT for EDS modeling Y is a directly formed of y=x+$\sigma_N$nu L×M Hankel matrix) after its SVD or by EVD of the product YY', where Y' is the complex conjugate transpose of Y, and of the ratios $r_k = \sigma_{X,k}^2 / \sigma_{Y,k}^2$ with k=1, . . . , $K_m$+D. Due to this SVD of Y or EVD of YY' the computational load of the disclosed NAT is approximately twice higher than of the ITC, but remains many times lower than of the eigenvector-based techniques mentioned above;

Determination of a threshold $tr_r$ for the ratios $r_k$ with k=1, . . . , $K_m$ as $tr_r = dtr_r + (r_k + \ldots + r_{Km+D})/(K_m+D-k+1)$, where $dtr_r$=0.03 in the DOA estimation, $dtr_r$=0.02 in the EDS modeling and initially k=$K_m$+1, but to cope with casual trends of the ratios $r_k$ with k≦$K_m$ corresponding to the noise subspace, after that in a programming loop for k=$K_m$, . . . , 1 the threshold $tr_r$ is updated every time when $r_k$<$tr_r$;

The signal subspace dimension K is determined using an introductory value K=0 and a programming loop for $k=1, \ldots, K_m$, where if $r_k < tr_r$ is found the determination of K is ceased, otherwise if the NAT variable $v_k = r_k + k_v (r_k - r_{k+1})$ that is tuned by the coefficient $k_v$ to enhance the gap between the subspaces is above the threshold $tr_v = tr_r + dtr_v$ with a tuning offset $dtr_v$, K is set equal to the current index k. The tuning parameters for the NAT variable $v_k$ and its threshold $tr_v$ are $k_v = 0.75$, $dtr_v = 0.03$ in the DOA estimation and $k_v = 0.67$, $dtr_v = 0.1$ in the EDS modeling, where larger variations of the ratios $r_k$ are observed.

Figure 2:
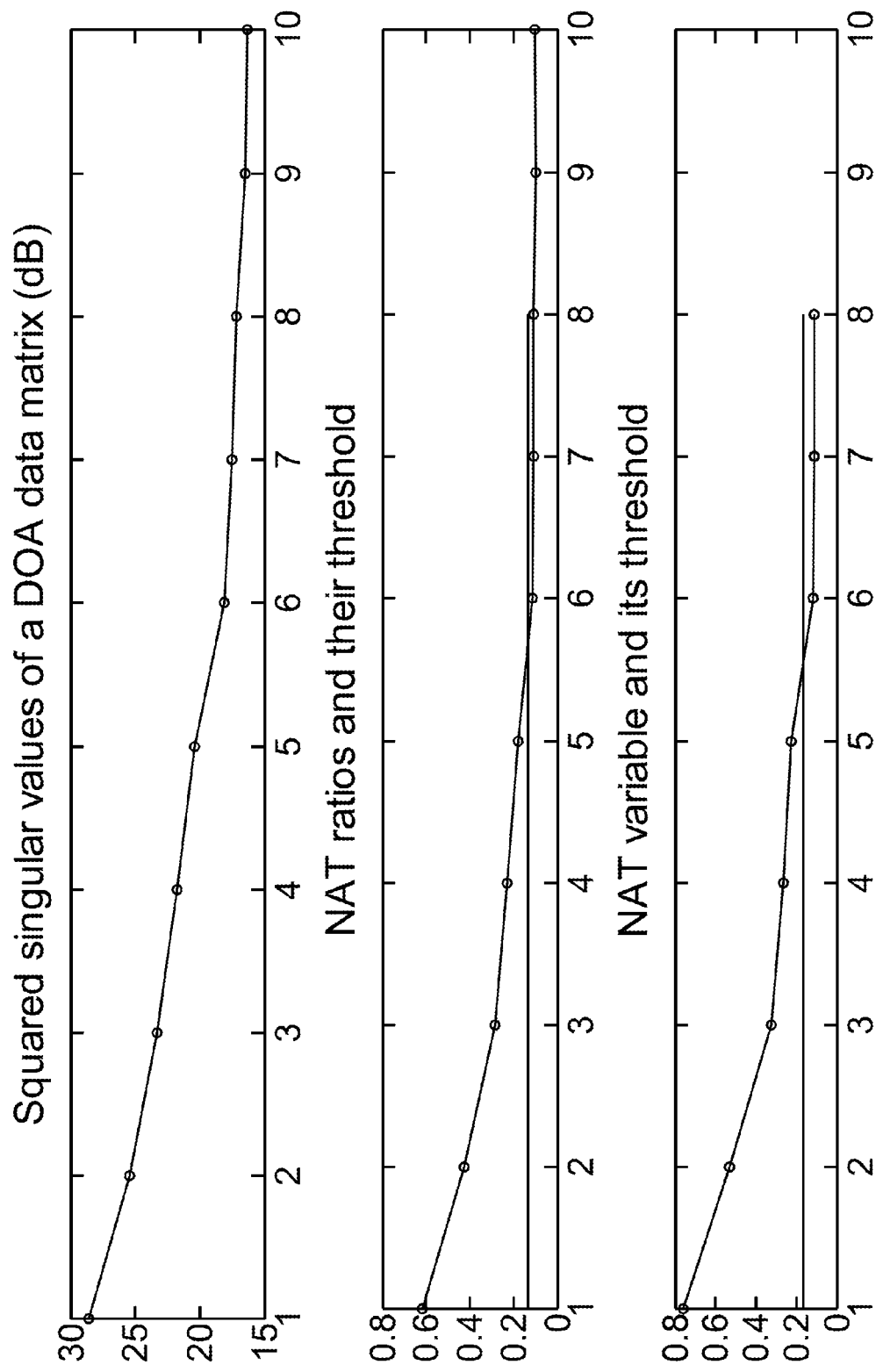
FIG. 2 illustrates an application of the disclosed technique for determination of the signal subspace dimension K in the DOA estimation.
Figure 3:
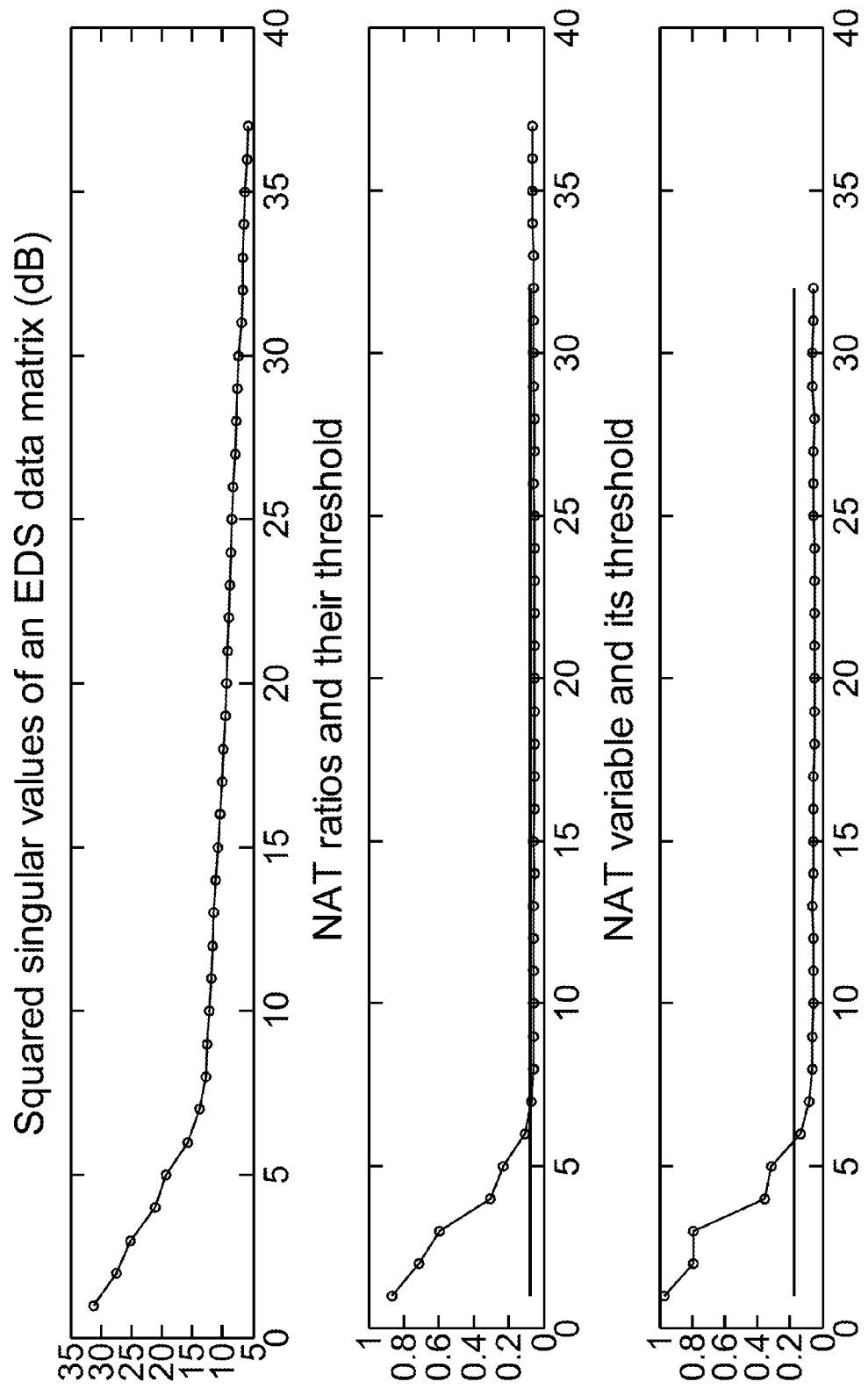
FIG. 3 illustrates an application of the disclosed technique for determination of the signal subspace dimension K in the EDS modeling.

The disclosed NAT is tested using various signals generated by the EDS model (1). For comparison both examples presented in FIGS. 2 and 3 are with a signal used in J. M. Papy et al., "A Shift Invariance-Based Order-Selection Technique for Exponential Data Modeling", July 2007, *IEEE Signal Processing Letters*, vol. 14, pp. 473-476. It has K=5 components of amplitudes $c_k = 2, 1, 1, 1, 1$, noticeable damping factors $\alpha_k = 0.1, 0.01, 0.02, 0.03, 0.05$ s$^{-1}$, frequencies $f_k = -0.2, 0.2, 0.3, 0.35, 0.4$ Hz and is sampled at intervals $\Delta t = 1$ s to generate a noiseless series $s = [s_0, s_1, \ldots, s_{n-1}]$ of n=128 complex values used in both examples.

An application of the disclosed technique for determination of the signal subspace dimension K in the DOA estimation is illustrated in FIG. 2. To simulate the data matrices X used in DOA estimation with a uniform linear array of L=16 sensors, the series s is set into a 16×113 Hankel matrix S, that is added with non-structured 16×113 matrices W each composed of random entries from a complex normal distribution with zero mean and standard deviation $\sigma_W$. The squared singular values $\sigma_{X,k}^2$ with $k=1, \ldots, K_m + D = 10$ of one such data matrix X=S+W with $\sigma_W = 0.6$ are shown in the top panel of FIG. 2 displaying that at this noise level $\sigma_{X,k}^2$ with k>K=5 are neither far below $\sigma_{X,K}^2$ nor uniform.

From the last two $\sigma_{X,k}^2$ presented in FIG. 2 a standard deviation $\sigma_N = 1.86$ is obtained for the auxiliary matrix $N = \sigma_N N_u$ used to form Y=X+N. The essential ratios $r_k = \sigma_{X,k}^2 / \sigma_{Y,k}^2$ with $k=1, \ldots, K_m + D$ shown in the middle panel of FIG. 2 demonstrate that the relatively high values of $\sigma_N$ used in the disclosed NAT yield practically uniform ratios $r_k$ with k>K and $k \leq K_m + D$ corresponding to the noise subspace. This finding is used to define the threshold for the ratios $r_k$ presented in the middle panel of FIG. 2, and both the NAT variable $v_k = r_k + 0.75(r_k - r_{k+1})$ enhancing the gap between the subspaces and its threshold, that are shown in the bottom panel of FIG. 2. FIG. 2 displays that using $r_k$ and $v_k$ with $k=1, \ldots, K_m$ and their thresholds, a true signal subspace dimension K=5 is determined in this application of the disclosed NAT in the DOA estimation.

In 20000 tests (performed in 2 min using a 3 GHz desk-top computer and MATLAB® of MathWorks®) with the described series s and 1000 different 16×113 noise matrices W for each $\sigma_W = 0.1, 0.2, \ldots, 2.0$ the NAT causes one false alarm (K=6), is exact at all $\sigma_W \leq 0.6$ and upwards determines a steadily decreasing to zero dimension K of the signal subspace. To better present the NAT performance in the DOA estimation it should be noticed that both frequency differences of the forth and its adjacent signal components in s are 2.5 times lower than the Rayleigh angular resolution 2/L=0.125 of the simulated array. Besides the damping factors of the signal components sizably widen their spectral peaks and decrease the SNR in the consecutive rows of X=S+W simulating the signals from the respective array sensors.

Next tests using the same signal but without damping and 1000 different 16×113 noise matrices W for each $\sigma_W = 0.2, 0.4, \ldots, 4.0$ show that the NAT does not cause any false alarms and is exact at $\sigma_W \leq 2.2$. Further series of tests under various conditions demonstrate that the performance of the disclosed NAT increases if the signal components are sparse and when the array used in the DOA estimation includes more sensors.

An application of the disclosed technique for determination of the signal subspace dimension K in the EDS modeling is illustrated in FIG. 3. To simulate the data matrices X used in the EDS modeling the described noiseless series s is added with vectors $w = [w_0, w_1, \ldots, w_{n-1}]$ each composed of n=128 random entries from a complex normal distribution with zero mean and standard deviation $\sigma_W$ and x=s+w are set into 64×65 Hankel matrices X. The squared singular values $\sigma_{X,k}^2$ with $k=1, \ldots, K_m + D = 37$ of one such data matrix X with $\sigma_W = 0.3$ are shown in the top panel of FIG. 3 displaying that at this noise level $\sigma_{X,k}^2$ with k>K=5 are neither far below $\sigma_{X,K}^2$ nor uniform.

From the last five $\sigma_{X,k}^2$ presented in FIG. 3 a standard deviation $\sigma_N = 1.27$ is obtained for $y = x + \sigma_N nu$ used to form Y=X+N directly. The essential ratios $r_k = \sigma_{X,k}^2 / \sigma_{Y,k}^2$ with $k=1, \ldots, K_m + D$ shown in the middle panel of FIG. 3 demonstrate that the relatively high values of $\sigma_N$ used in the disclosed NAT yield nearly uniform ratios $r_k$ with k>K=5 and $k \leq K_m + D$ corresponding to the noise subspace. This finding is used to define the threshold for the ratios $r_k$ presented in the middle panel of FIG. 3, and both the NAT variable $v_k = r_k + 0.67(r_k - r_{k+1})$ enhancing the gap between the subspaces and its threshold, that are shown in the bottom panel of FIG. 3. FIG. 3 displays that using $r_k$ and $v_k$ with $k=1, \ldots, K_m$ and their thresholds, a true signal subspace dimension K=5 is determined in this application of the disclosed NAT in the EDS modeling.

In 20000 tests (performed in 8 min using the above-cited computer and software) with the described series s and 1000 different noise vectors w for each $\sigma_W = 0.05, 0.1, \ldots, 1.0$ the NAT causes 25 false alarms (in 24 of them K=6 and once K=7), is very accurate (two overestimates K=6 and one underestimate K=4) at all $\sigma_W \leq 0.3$ and upwards determines a steadily decreasing to zero dimension K of the signal subspace.

The tests with various EDS modeled real-valued signals of different lengths show that the presented performance of the NAT considerably increases when the processed data series include more samples. Therefore the disclosed NAT is very appropriate for the digital audio, where an adequate application of the EDS model can originate improved coding schemes.

From the above description of the two preferred embodiments, those skilled in the art will not only understand the invention and its advantages, but will also find apparent various changes of the disclosed technique for determination of the signal subspace dimension K in the DOA estimation and in the EDS modeling. Therefore it is sought to cover all such modifications as falling within the spirit and scope of the present invention defined by the appended claims.

What is claimed is:

1. A technique for determination of the signal subspace dimension K in direction of arrival (DOA) estimation and in exponentially damped sinusoids (EDS) modeling, two tasks where said signal subspace dimension K represents respectively the number of detected objects and the model order, and where the samples obtained by analog-to-digital conversion (ADC) of the sensors signals are put into a data matrix that is numerically processed through a computer needed to achieve the desired results of the DOA estimation or the EDS modeling in real-time, said technique comprising:
   (a) storing the samples obtained by said ADC of the sensors signals respectively into a complex-valued L×M data matrix X with $L \geq 2$ and M>>L in the DOA estimation, or into a complex or real-valued data vector $x=[x_0, x_1, \ldots, x_{n-1}]$ with $n \geq 100$ and then storing x into a Hankel L×M data matrix X with L=M−1 or L=M and L+M−1=n in the EDS modeling;

(b) generating random numbers nu having real or complex normal distribution with zero mean and standard deviation $\sigma=1$ and storing them into a noise matrix $N_u$ or a noise vector $nu=[nu_0, nu_1, \ldots, nu_{n-1}]$ that respectively fit in sizes and kind (complex-valued or real) said data matrix X in the DOA estimation and said data vector x in the EDS modeling (single $N_u$ or nu is necessary when series of similar data matrices X are under processing in the DOA estimation or in the EDS modeling);

(c) computing the squared singular values $\sigma_{X,1}^2 \geq \sigma_{X,2}^2 \geq \ldots \geq \sigma_{X,L}^2 \geq 0$ of said data matrix X and estimating the standard deviation $\sigma_W$ of its noise by computing square root of $(\sigma_{X,Km+1}^2 + \ldots + \sigma_{X,Km+D}^2)/(DM)$, where $K_m$ and D are tuning parameters;

(d) determining a standard deviation $\sigma_N = k_N s_W$ with a lower limit $\sigma_0$, where $k_N$ and $\sigma_0$ are tuning parameters, and forming a matrix Y=X+N respectively by scaling said noise matrix $N_u$ into an auxiliary matrix $N=\sigma_N N_u$ and adding to it said data matrix X in the DOA estimation, or only by scaling said noise vector nu to $\sigma_N$nu and adding to it said data vector x into a vector $y=x+\sigma_N$nu and then storing y into a Hankel L×M matrix Y that fits in sizes said data matrix X in the EDS modeling;

(e) computing the squared singular values $\sigma_{Y,1}^2 \geq \sigma_{Y,2}^2 \geq \ldots \geq \sigma_{Y,L}^2 \geq 0$ of said matrix Y and the ratios $r_k = \sigma_{X,k}^2/\sigma_{Y,k}^2$ with $k=1, \ldots, K_m+D$ between said squared singular values $\sigma_{X,k}^2$ and $\sigma_{Y,k}^2$ of Y, where said data matrix X is added with noise having real or complex normal distribution with zero mean and standard deviation $\sigma_N$.

2. A technique as set forth in claim 1, comprising:
computing a threshold $tr_r = dtr_r + (r_k + \ldots + r_{Km+D})/(K_m+D-k+1)$ for $r_k$ with $k=1, \ldots, K_m$, where $dtr_r$ is a tuning parameter and initially $k=K_m+1$, but then in a programming loop for $k=K_m, \ldots, 1$ $tr_r$ is updated using the current index k every time when $r_k < tr_r$ is found.

3. A technique as set forth in claim 2, comprising:
computing a variable with values $v_k = r_k + k_v(r_k - r_{k+1})$ for $k=1, \ldots, K_m$ and a threshold $tr_v = tr_r + dtr_v$, where $k_v$ and $dtr_v$ are tuning parameters.

4. A technique as set forth in claim 3, comprising:
determining said signal subspace dimension K using an introductory value K=0 and a programming loop for $k=1, \ldots, K_m$, where if $r_k < tr_r$ is found the determination of K is ceased, otherwise if $v_k > tr_v$, K is set equal to the current index k.

5. A technique as set forth in claim 4, comprising:
adjusting said tuning parameters for determination of said signal subspace dimension K in the direction of arrival estimation, selecting: $K_m$ equal to the whole part of L/2, D=1 if L=2, otherwise D=2, $k_N=3$, $\sigma_0=10^{-8}$, $dtr_r=0.03$, $k_v=0.75$ and $dtr_v=0.03$.

6. A technique as set forth in claim 4, comprising:
adjusting said tuning parameters for determination of said signal subspace dimension K in the exponentially damped sinusoids modeling, selecting: $K_m$ equal to the whole part of L/2, D=5, $k_N=5$, $\sigma_0=10^{-8}$, $dtr_r=0.02$, $k_v=0.67$ and $dtr_v=0.1$.

* * * * *